United States Patent [19]

Doddington et al.

[11] Patent Number: 4,783,808

[45] Date of Patent: Nov. 8, 1988

[54] CONNECTED WORD RECOGNITION ENROLLMENT METHOD

[75] Inventors: George R. Doddington, Richardson; Michael L. McMahan, Plano, both of Tex.

[73] Assignee: Texas Instruments Incorporated, Dallas, Tex.

[21] Appl. No.: 856,722

[22] Filed: Apr. 25, 1986

[51] Int. Cl.[4] .................................................. G10L 5/00
[52] U.S. Cl. .......................................... 381/43; 381/51
[58] Field of Search ...................... 381/41–43, 381/51-53

[56] References Cited

U.S. PATENT DOCUMENTS

| 4,520,499 | 5/1985 | Montlich et al. | 381/43 |
| 4,624,008 | 11/1986 | Vensko et al. | 364/513.5 |
| 4,633,499 | 12/1986 | Nishioka et al. | 381/43 |
| 4,703,504 | 10/1987 | Vittorelli | 381/51 |

Primary Examiner—Emanuel S. Kemeny
Attorney, Agent, or Firm—Kenneth C. Hill; James T. Comfort; Melvin Sharp

[57] ABSTRACT

A method for generating connected word templates begins with generating isolated word templates of selected words. The isolated word templates are used to extract a continuous word template from a segment of continuous speech containing the selectd words. Both the isolated word templates and the connected word templates can be used to generate speech to determine the quality of the generated templates through aural judgment.

7 Claims, 1 Drawing Sheet

CONNECTED WORD RECOGNITION ENROLLMENT METHOD

BACKGROUND AND SUMMARY OF THE INVENTION

The present invention relates generally to speech recognition, and more specifically to an enrollment method for generating speech recognition templates.

One difficulty encountered in the machine recognition of connected speech is the fact that words spoken in a connected utterance can differ significantly from the same words spoken in isolation. These differences occur for several reasons. One reason is that the words spoken in connected speech are typically shorter than the same words spoken in isolation. The second difference is due to coarticulation effects of words spoken in connected speech.

Another problem encountered in speech recognition systems generally is the difficulty of determining the quality of vocabulary templates during the enrollment phase. The quality of the enrollment is critical to the performance of a speech recognizer. Currently, the only method to test the quality of the enrollment is to actually check the recognition performance of the system using the enrolled templates.

It is therefore an object of the present invention to provide a method for improving the enrollment process for connected word templates. It is another object of the present invention to improve and simplify checking of the quality of the enrollment.

Therefore, according to the present invention, isolated word templates are created of the words in the desired vocabulary. These templates are time compressed, and then used to extract connected word templates from connected speech samples. The extracted connected word templates are used as the vocabulary templates for the connected speech recognizer. The extracted templates can be used to synthesize speech at both the isolated word and connected word levels in order to ascertain the quality of the enrollment.

The novel features which characterize the present invention are defined by the claims. The foregoing and other objects and advantages of the present invention will hereafter appear, and for purposes of illustration, but not of limitation, a preferred embodiment is shown in the accompanying drawings.

DESCRIPTION OF THE PREFERRED EMBODIMENT

The embodiment of the present invention may be practiced with speech recognition hardware representing the current state of the art. The extraction of information from speech signals is known, such information typically being retained as linear predictive coding (LPC) parameters. Synthesis of speech from LPC parameters is also known.

The invention will be described in reference to its use in a speaker dependent connected word recognition system. An example of such a system would be the TI-Speech system available for use with the Texas Instruments Personal Computer.

The preferred method is used to generate templates to be used in a continuous word speech recognition system or a speaker verification system. These templates will be stored in the speech recognition system for later recognition of speech input.

The term "word" as used herein refers to an atomic utterance, regardless of its actual correspondence to an English word. A "word" is simply a piece of speech, and the term "sentence", as used with "word" refers to a structure comprised of "words". A "word" could actually be comprised of only portions of dictionary words, or of several dictionary words spoken together.

Figure 1:
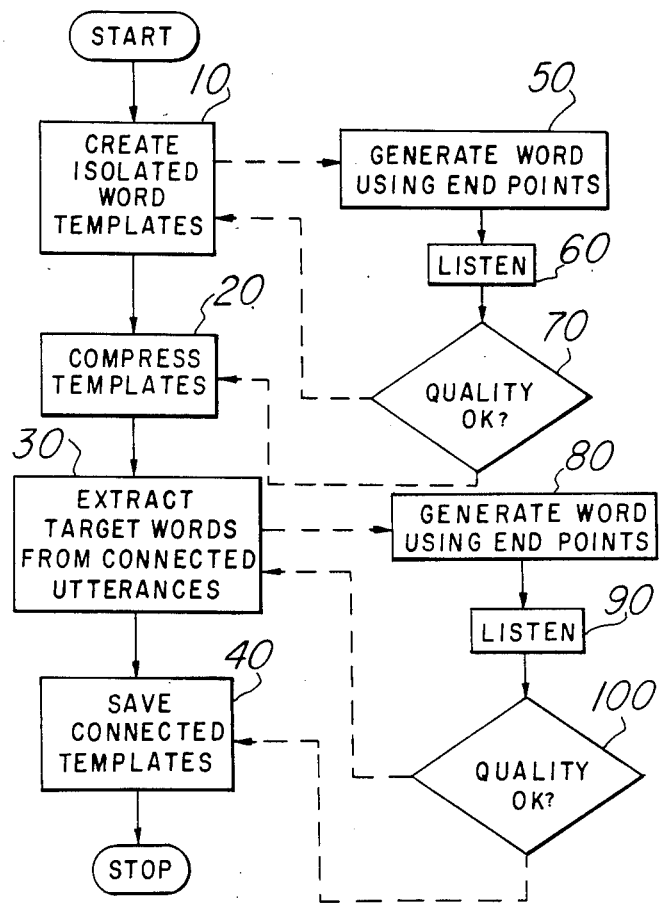
FIG. 1 is a flow chart showing a method of enrollment according to the present invention.

Referring to FIG. 1, isolated word templates are created (step 10) for each word in the vocabulary as known in the art. Speaker dependent isolated word templates are created by prompting the speaker to say each word in the vocabulary, and storing the speaker's spoken responses. From these responses, LPC parameters are extracted to form isolated word templates.

Since connected speech tends to be faster than isolated word speech, it is preferable to compress the isolated word templates (step 20). A simple time compression of data is known to change the frequency of that data, so a balancing frequency shift must also be made during the compression. If the template is time compressed by 80%, the frequencies of the resulting compressed data must also be lower by 80%. These steps are undertaken in accordance with known principles.

After the templates are created, the speaker is prompted to utter a series of test sentences which contain the words being enrolled. The compressed isolated word templates are used to locate the desired word within the test sentence, and the speech data corresponding to the word is transformed into a connected word template(step 30). This connected word template will differ somewhat from the isolated word template in that it will include coarticulation effects. The connected word templates are then saved to be used as reference templates for a connected word recognizer (step 40).

Figure 2:
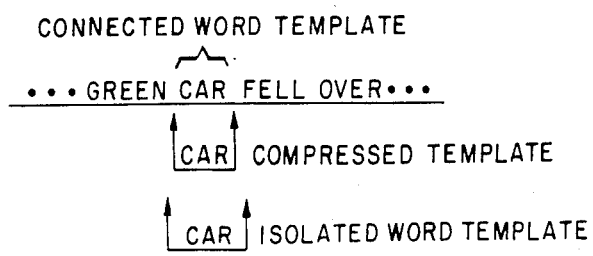
FIG. 2 is a timing diagram illustrating the template extraction process.

An example of this process is illustrated with respect to FIG. 2. Assuming that the word "CAR" is to be enrolled into a connected word vocabulary, a template is made of the isolated word "CAR". When the template is compressed, it will give a closer match to the word "CAR" as it is typically spoken in a connected sentence. The template for "CAR" is then matched with a sentence including, for example, the phrase ". . . GREEN CAR FELL OVER . . . " . The compressed template is good enough to locate the word "CAR" within the sentence, and the connected word template is extracted from the location thus found.

One problem with enrollment for a connected word recognizer is the difficulty of checking the quality of the enrollment. In the preferred embodiment, a simple and effective checking means is provided. When the isolated word template is created, the template is used to drive a speech synthesizer (step 50) in accordance with known principles. The speaker listens to the generated speech (step 6), and receives immediate feedback of the quality of the template. If the quality is not good (step 70), the speaker is able to re-enroll that word until he is satisfied with the quality of the template obtained.

Additionally, once the connected word templates have been obtained, they can be used to drive a synthesizer (step 80) in order to check on their quality. The connected word templates can be listened to (step 90)

and checked (step 100) individually, but are preferably combined into sample sentences such as those which the speech recognizer is expected to recognize. In this manner, the speaker can immediately determine the quality of the connected word templates and re-enroll any that are of low quality.

TECHNICAL ADVANTAGES

The described method for enrolling words into a vocabulary for a connected word recognizer is simple, efficient and greatly improves the quality of the templates obtained. Testing is a simple matter of having the speaker listen to a re-synthesis of the stored patterns, which should correspond to his voice. Such an enrollment method can easily be used in any connected word speech recognition system, including those of simple design and low cost.

Such an enrollment method can also be used to create connected word templates for speaker independent recognition systems. A speaker independent isolated word template is generated in the usual manner, and used to extract words from connected utterances by multiple speakers from a standard data base. The words thus extracted can be combined in order to extract their common features, which provides a speaker independent connected word template. Aural feedback of the templates as described above can be used to improve their overall quality.

The present invention has been illustrated by the methods described above, and it will become apparent to those skilled in the art that various modifications and alterations may be made thereto. Such variations fall within the spirit of the present invention, the scope of which is defined by the appended claims.

What is claimed is:

1. A method for generating a template for recognition of connected speech, comprising the steps of:
   (a) generating an isolated word template of a selected word;
   (b) identifying the selected word from a stream of continuous speech by matching the continuous speech with the isolated word template; and
   (c) extracting a continuous word template from the continuous speech which corresponds to the selected word.

2. The method of claim 1, further comprising the step of:
   (d) before step (b), compressing the isolated word template.

3. The method of claim 1, further comprising the steps of:
   (e) after step (a), generating speech from the isolated word template;
   (f) listening to the generated speech; and
   (g) if the generated speech is not suitable, returning to step (a).

4. The method of claim 1, further comprising the steps of:
   (h) after step (c), generating speech from the connected word template;
   (i) listening to the generated speech; and
   (j) if the generated speech is not suitable, returning to step (a).

5. A method for generating a template for recognition of connected speech, comprising the steps of:
   (a) creating an isolated speech template of a selected utterance;
   (b) generating an utterance from the isolated speech template, listening to the generated speech, and returning to step (a) if the isolated speech template is insufficient;
   (c) compressing the isolated speech template;
   (d) identifying the selected utterance from a stream of continuous speech by matching the continuous speech with the isolated speech template;
   (e) generating an utterance from the connected speech template, listening to the generated speech, and returning to step (d) if the connected speech template is insufficient; and
   (f) retaining the connected speech template as the generated template.

6. A method for creating a template for recognition of connected speech, comprising the steps of:
   (a) determining the endpoints of a selected isolated word;
   (b) generating the selected word to detect the accuracy of endpoint detection;
   (c) if the endpoints are not sufficiently accurate, returning to step (a);
   (d) matching a continuous utterance with an isolated template of the selected word to determine connected word endpoints;
   (e) generating the selected connected word to detect the accuracy of endpoint detection; and
   (f) if the endpoints are sufficiently accurate, saving the connected word template.

7. The method of claim 6, wherein steps (b) and (e) include detecting the quality of the selected word.

* * * * *